United States Patent [19]

Nielsen et al.

[11] 4,047,722
[45] Sept. 13, 1977

[54] HAMMER DRILLING DEVICES

[75] Inventors: Mogens B. Nielsen, Glostrup; Niels Halfdan Boa, Greve Strand; Jimmy Jensen, Glostrup, all of Denmark

[73] Assignee: H. Reinholdt A/S, Farum, Denmark

[21] Appl. No.: 605,817

[22] Filed: Aug. 19, 1975

[30] Foreign Application Priority Data

Aug. 19, 1974 Germany .............................. 2440082
Oct. 29, 1974 Germany .............................. 2451265

[51] Int. Cl.² .................... B23B 31/06; B23B 51/08; B23B 51/12
[52] U.S. Cl. ................................. 279/19.5; 175/395; 279/89
[58] Field of Search .......................... 279/19, 19.5, 89; 408/226; 403/348, 349; 175/395; 308/26, DIG. 7

[56] References Cited

U.S. PATENT DOCUMENTS

| 1,091,263 | 3/1914 | Waugh | 279/19.5 |
| 1,161,907 | 11/1915 | Summers | 279/19 |
| 2,219,907 | 10/1940 | Ross | 403/349 X |
| 2,279,960 | 4/1942 | Terry | 279/19.5 |
| 2,316,679 | 4/1943 | Evans | 403/349 X |
| 2,965,418 | 12/1960 | Edler | 308/DIG. 7 |
| 3,348,887 | 10/1967 | Sheps | 308/26 |

FOREIGN PATENT DOCUMENTS 575,906  5/1933  Germany .............................. 279/19.5

Primary Examiner—Othell M. Simpson
Assistant Examiner—Horace M. Culver
Attorney, Agent, or Firm—Fleit & Jacobson

[57] ABSTRACT

In a drilling device, especially a hammer drill, a tool is coupled to a tool receiving means by co-operating male and female coupling elements which ensure uniform rotational motion of the tool in relation to the tool receiving means; additional transition and guiding surfaces being provided for inserting or removing the tool single-handed.

15 Claims, 9 Drawing Figures

HAMMER DRILLING DEVICES

BACKGROUND OF THE INVENTION

The present invention is directed to the replaceably engagement of drills in the drill socket of a hammer drill, or of a matcher or adaptor which in turn is replaceably mounted in a hammer drill.

Coupling means used for this or a similar purpose are shown in U.S. Pat. No. 3,690,390, German Published Examined Specification (DT-AS) No. 1,652,684, and German Published Unexamined Specification (DT-OS) No. 2,219,309.

In a hammer drilling device strong rotational and percussion forces are to be transmitted to a drill which is inserted in a socket of the hammer drill or of a matcher by which the drill is connected to the hammer drill comprising a source of rotational and percussion power. An essential feature of hammer drilling devices is that during rotation axial blows are transmitted to the drill. Therefore, either the drill in relation to the socket, or drill and socket together in relation to the source of percussion power must be able to reciprocate in axial direction over a limited interval, in reaction to the transmission impact. In consideration of the rather strong forces transmitted to the drill, and further by the latter to, e.g., a concrete wall, drills are coupled to the socket usually in that way that a special locking mechanism is provided, or that the engagement between the drill shaft and the socket is automatically tightened by the normal operation of the device so that substantial force is needed afterwards for removing the drill from the socket. For these reasons conventional hammer drills either make use of complicated and rather expensive sockets, or need quite a time for changing the tools.

OBJECTS AND SUMMARY OF THE INVENTION

It is a main object of the present invention to overcome the above mentioned drawbacks of the prior art.

A further object of the invention is to provide a drilling device especially suited for hammer drilling and comprising a tool receiving means with which a drill may be coupled by radially projecting parts which preferably may be stationary.

It is a further object of the invention to provide a drill socket and a drill which may be mounted in the socket single-handed.

A still further object of the invention is to provide a drilling device comprising a drill socket and drill replaceably mounted therein in that way that the drill may reciprocate over a limited axial distance during operation when rotational and axial percussion forces are exerted on the drill simultaneously.

It is also a primary object of the invention to provide a drilling device for safe and reliable operation of a drill, especially replaceably mounted therein.

A further object of the invention is to provide a power tool comprising a tool receiving means and a tool replaceably mounted therein, both parts being provided with interengaging stationary elements and surfaces for transmission of rotational drive forces and axial percussion forces to the tool.

In accordance with these objects a hammer drill socket is provided with at least one element radially projecting into the substantially cylindrical socket bore, and a drill to be received in that bore is provided with a substantially cylindrical shaft of a diameter corresponding to that one of the bore. The shaft is formed with at least one elongated recess extending in substantially axial direction and having a radial depth in correspondence to the radial extension of said element, the recess being closed at opposite axial ends by end closure faces. A transition between these closure faces and in spaced relation thereto, extends in peripheral direction and connects the recess with a guiding surface which in turn connects the transition surface with the free axial end of the drill shaft, the transition and the guiding surfaces being of the same radial depth as the recess.

The various features of novelty which characterize the invention are pointed out with particularity in the claims annexed to and forming a part of this specification. For a better understanding of the invention, its operating advantages and specific objects attained by its uses, reference should be had to the accompanying drawing and descriptive matter in which there are illustrated preferred embodiments of the invention.

DETAILED DESCRIPTION OF THE INVENTION

Figure 1:
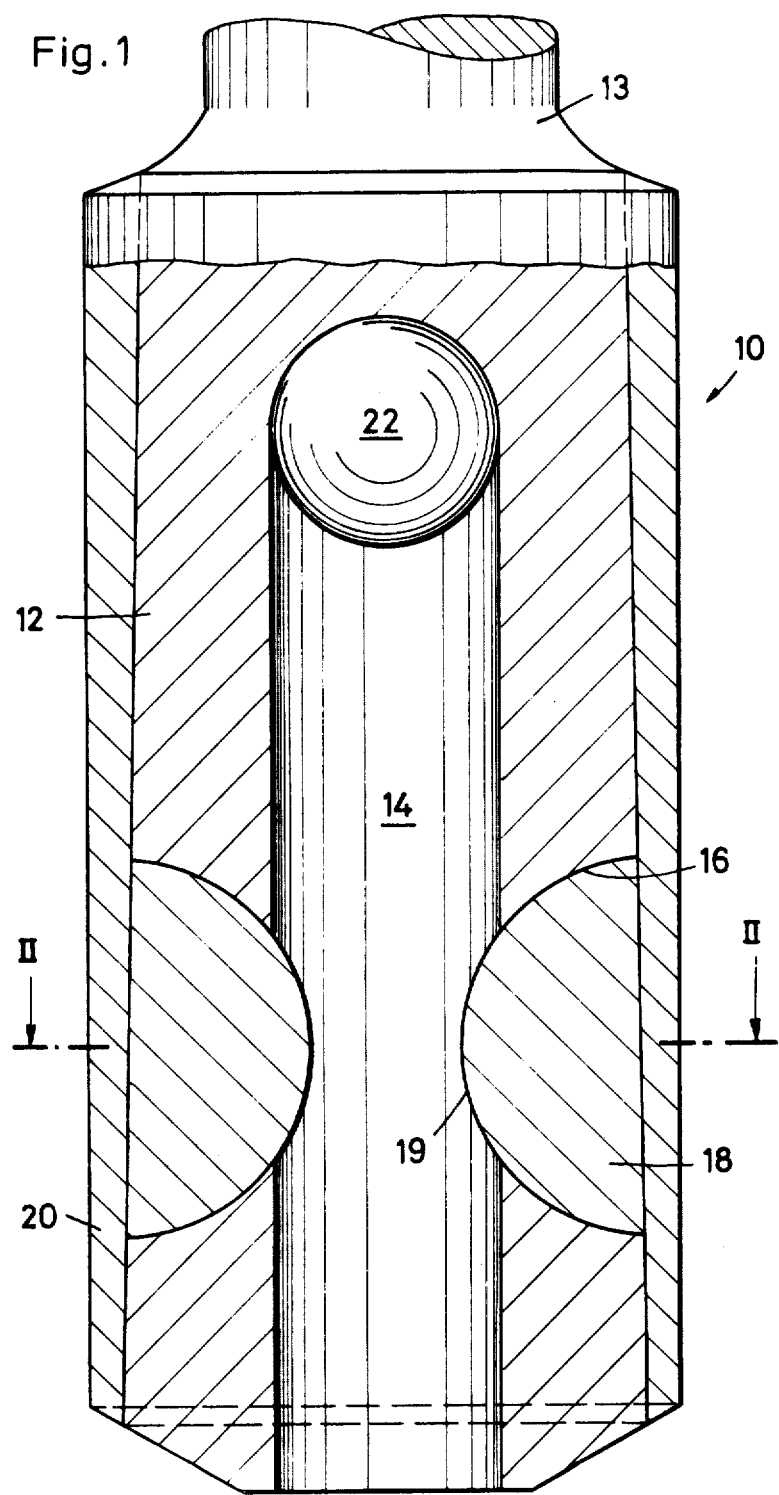
FIG. 1 is a partial view, partly in axial section, of a tool receiving means according to the present invention.

A drilling device according to the invention consists of a tool receiving means and a drill which are shown in FIGS. 1 and 2, and 3 and 4, respectively. A tool receiving means 10 is provided with a substantially cylindrical socket 12 defining a hole 14 which is open at the lower end, as shown in FIG. 1, and closed at the upper end. Preferably, socket 12 is integrally formed with a shaft 13 by which tool receiving means 10 is connected with, or is connectable to, respectively, a source of rotational and percussion power known per se and therefore not shown. Socket 12 is formed, see also FIG. 2, with two recesses 16 which may be considered as parts of cylindrical blind holes. The axes of recesses 16 are in parallel to a diameter of socket 12, but without intersection with the longitudinal axis of hole 14. Besides, the axes of recesses 16 are in the same radial plane of hole 14.

In each of the recesses 16, a conforming element 18 is fixedly secured. The elements 18 have identical shape which is a section of a cylinder. Elements 18 may be manufactured by machining cylindrical rollers to the desired shape, or preferably by pressure-sintering of metal powders. The partly cylindrical elements 18 project with their rounded bottom edges 17 and the adjacent parts 19 of the cylinder surfaces into hole 14. Elements 18 are secured to the walls of recesses 16 in a suitable way. Preferably, elements 18 are kept in their positions by means of a sleeve 20 shrunk-fit on the outer surface of socket 12.

In the embodiment according to FIG. 1, the outside of socket 12 and the inner wall of sleeve 20 have matching frusto-conical shapes so that sleeve 20 is supplementing socket 12 to cylindrical shape. In that way, the fixation of sleeve 20 on socket 12 is specially secured. For normal requirements, however, it will be sufficient to provide socket 12 and sleeve 20 with cylindrical outer and inner surfaces, respectively, and to fit sleeve 20 to socket 12 in that way that the heated sleeve is put on the socket so that after cooling the sleeve is firmly and tightly secured on the socket.

Figure 3:
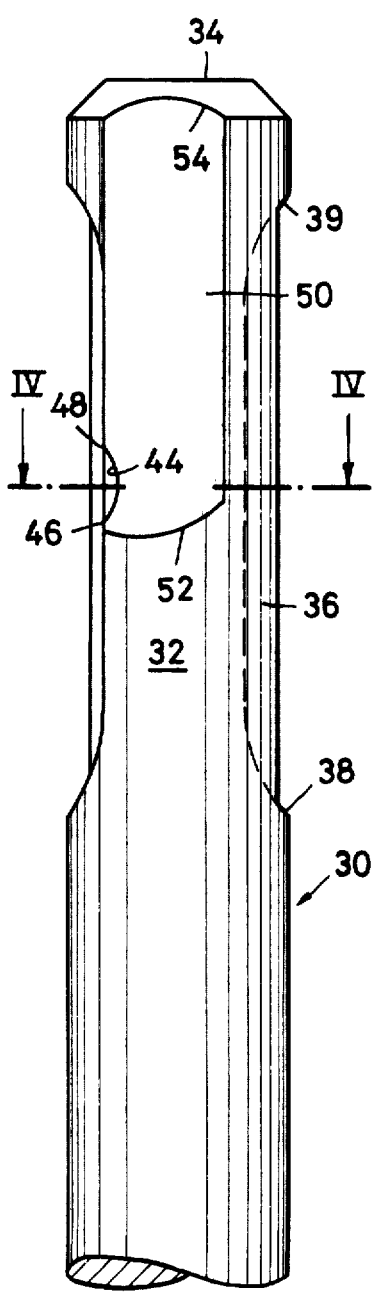
FIG. 3 is a side view of a drill shaft in accordance with the present invention.
Figure 2:
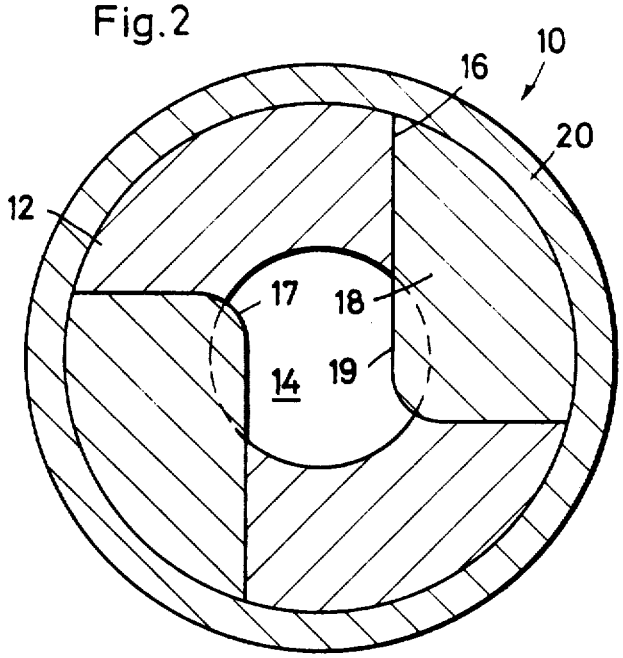
FIG. 2 is a view of a section along lines II — II of FIG. 1.
Figure 4:
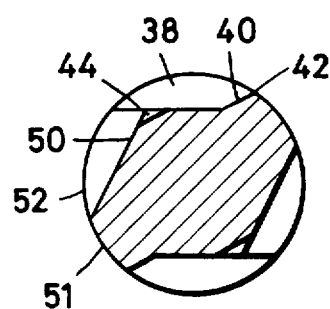
FIG. 4 is a view of a section along the lines IV — IV of FIG. 3.

Tool receiving means 10 is to be used together with a drill 30, see FIGS. 3 and 4, of which only a shaft 32 is shown, the other part, i.e., the spiral grooves and drilling tip, being conventional. Shaft 32 is provided with two substantially elongated recesses or grooves 36 in axial direction. Recesses 36 are in rotational-symmetrical relation to each other, see FIG. 4, and are closed at their axial ends by end surfaces 38, 39. Between ends 38, 39 each recess 36 is provided with an obtuse angle profile 40 which substantially corresponds to the form of profile 17, 19 as shown in FIG. 2. Profile 40 is shaped so that element 18 will practically not bear on edge 42 when it is in engagement with profile 40 for driving the drill clockwise in relation to FIGS. 2 and 4. That angle side of profile 40 which is adjacent to edge 42 is bordering recess 36 in the direction of rotation which is clockwise in FIG. 4. Instead of special profile 40 it may be possible to provide a recess of a simpler form, e.g., its radial section may be a straight line instead of angled profile 40.

Recess 36 is connected by a transition surface 44 with a guiding surface 50 which is open to the free end of shaft 32. The radial depths of recess 36, transition surface 44, and guiding surface 50 are chosen in correspondence to the radial extent by which element 18 projects into hole 14. However, manufacturing of drill 30 may be simplified by providing, see FIG. 4, a transition surface with a straight line section form; then, surface 44 is slightly deeper than necessary.

Preferably, transition surface 44 is bordered by two parallel radial planes in which the edges 46 and 48 of surface 44 are located. That means that the zenithal line of surface 44 is located in a radial plane of shaft 32 perpendicular to the longitudinal axis of drill 30. Guiding surface 50 is bordered or closed at that end facing the drilling end of drill 30, by surface portion 52. To the opposite or, in relation to FIG. 3, upper end of shaft 32, surface 50 is open at the edge 54.

Transition surface 44 is spaced in axial direction from closure surface 38 of recess 36 to such an extent that the portion of recess 36 bordered by closure surface 38 and edge 46 may be used for the normal reciprocating motion of drill 30 caused by percussion impulses. Therefore, there is no danger that the drill would be unintentionally released from the tool receiving means during normal use of the drilling device.

Transition surface 44 is spaced from upper closure surface 39 of recess 36 by such a distance that after completion of a bore hole drill 30 which is inserted in a tool receiving means 10 may be pulled out of the hole by moving tool receiving means 10 in axial direction away from the drilled hole. During that motion elements 18 slide along in recesses 36 and are brought into engagement with closure surfaces 39. The part of recess 36 above transition surface 44 has such a length in axial direction of shaft 32 that drill 30 will not be released from tool receiving means during the withdrawal step even when during this time an unintended rotational motion takes place. FIG. 4 shows that profile 40 extends over a substantial part of the periphery of shaft 32 so that there is a satisfactory guiding action between recess 36 and element 18 when after completion of the drilling operation the drill will be taken out of the drilled hole and element 18 slidingly passes over that part of recess 36 at which transition surfaces 44 is branching off.

The dimensions of all part are to be chosen in that way that also on that portion of shaft 32 in which recesses 36 and guiding surfaces 50 are located sufficiently wide sectors 51 of the cylindrical shaft surfaces are left over for additional guidance of shaft 32 in hole 14. For the same purpose also that part of the shaft periphery is used which is located between end portions 39 of recesses 36 and end surface 34 of shaft 32.

The embodiment of the invention as shown in FIGS. 1 – 4, is provided with two elements 18, two recesses 36, and accordingly, two groups of surfaces 44 and 50 which are in rotational symmetrical relation to each other, and are separated by two peripheral portions 51. For tool receiving means and drills of smaller diameter it would be sufficient to have one element 18, and accordingly, one recess 36 together with one transition surface 44 and one guiding surface 50. On the other hand, when using tool receiving means and drills of a larger diameter it would be recommendable to make use of three elements 18 cooperating with three groups of means 36, 44, 50.

Attention should be paid also to the fact that operational safety is ensured by the fact that in the shown embodiment for inserting a drill 30 into a receiving means 10, or releasing it therefrom, respectively, always three motions are necessary, one following after the other by a substantially right angle. During this step the end surface 52 may exert a certain cam or guiding action.

Figure 5:
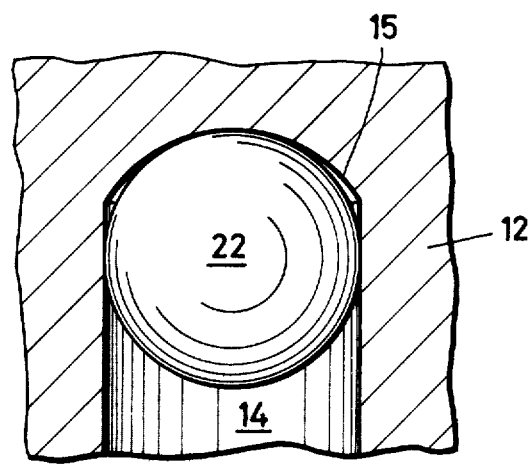
FIG. 5 shows a detail of a tool receiving means according to FIG. 1 on a larger scale.

In a hammer drilling device according to the present invention, the percussion power will be transferred to the drill shaft 32 by end surface 34 abutting against the bottom of hole 14. Preferably, the bottom of hole 14 is formed in that way that drill 30 is impinged upon in exactly axial direction. For this reason a ball 22 is mounted at the bottom of hole 14 the ball being of a metal which preferably is harder than the material of shaft 32. Ball 22, see FIG. 5, is pressed into hole 14. Bottom 15 of hole 14 was originally given a radius of curvature which is slightly greater than the radius of ball 22. The difference may be up to about 10 percent. The material of ball 22 is also harder than that of socket 12. In this way already during the first use the material adjacent to bottom 15 will be compacted by reaction with the ball which thereafter snugly fits to the bottom 15.

Figure 6:
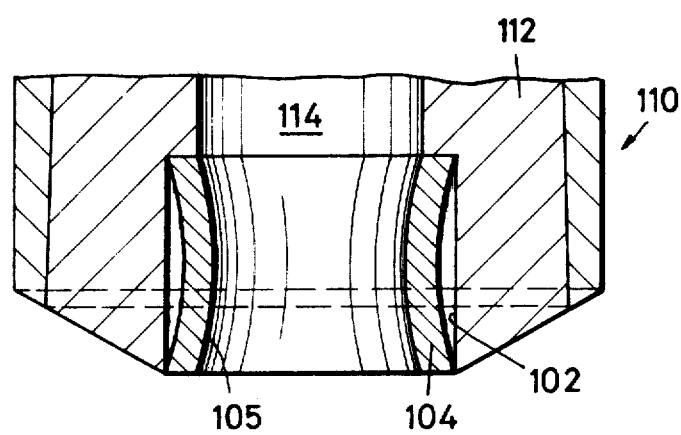
FIG. 6 is a part of a view similar to FIG. 1, illustrating a slightly modified embodiment of a tool receiving means in accordance with the present invention.

FIG. 6 shows a slightly modified embodiment of the invention. In this example a socket 112 of a tool receiving means 110 is provided at its receiving opening with a counter bore 102. In counterbore 102 a sleeve 104 is mounted the inner wall 105 of which may be considered as extension of the adjoining wall of hole 114. Sleeve 104 is of a material which reduces friction between the insert and the socket in this part of the device. Preferably, sleeve 104 is resilient, and in its middle part, as shown, slightly arched to the interior. Sleeve 104 may be for example of sintered metal the pores of which are filled with dry lubricants, for instance molybdenum sulphide or graphite. But also a plastics material like, e.g., Teflon, or a thermoplastic resin of the acetal type or similar materials may be used for sleeve 104. At the upper and lower edges as shown in FIG. 6, sleeve 104 is fixedly connected to socket 112; in dependence of its material, the outside of the sleeve may be concave in the area between the edges, as shown, and may leave an annular cavity to the counterbore, or the sleeve may be crowned at the inside, and cylindrical at the outside.

Sleeve 104 helps in decreasing the wear of a hammer drilling device according to the invention. Besides, it provides for a low friction guide, and when the material of sleeve 104 shows a certain elasticity, for compensation of play which is unavoidable after extended use.

Figure 7:
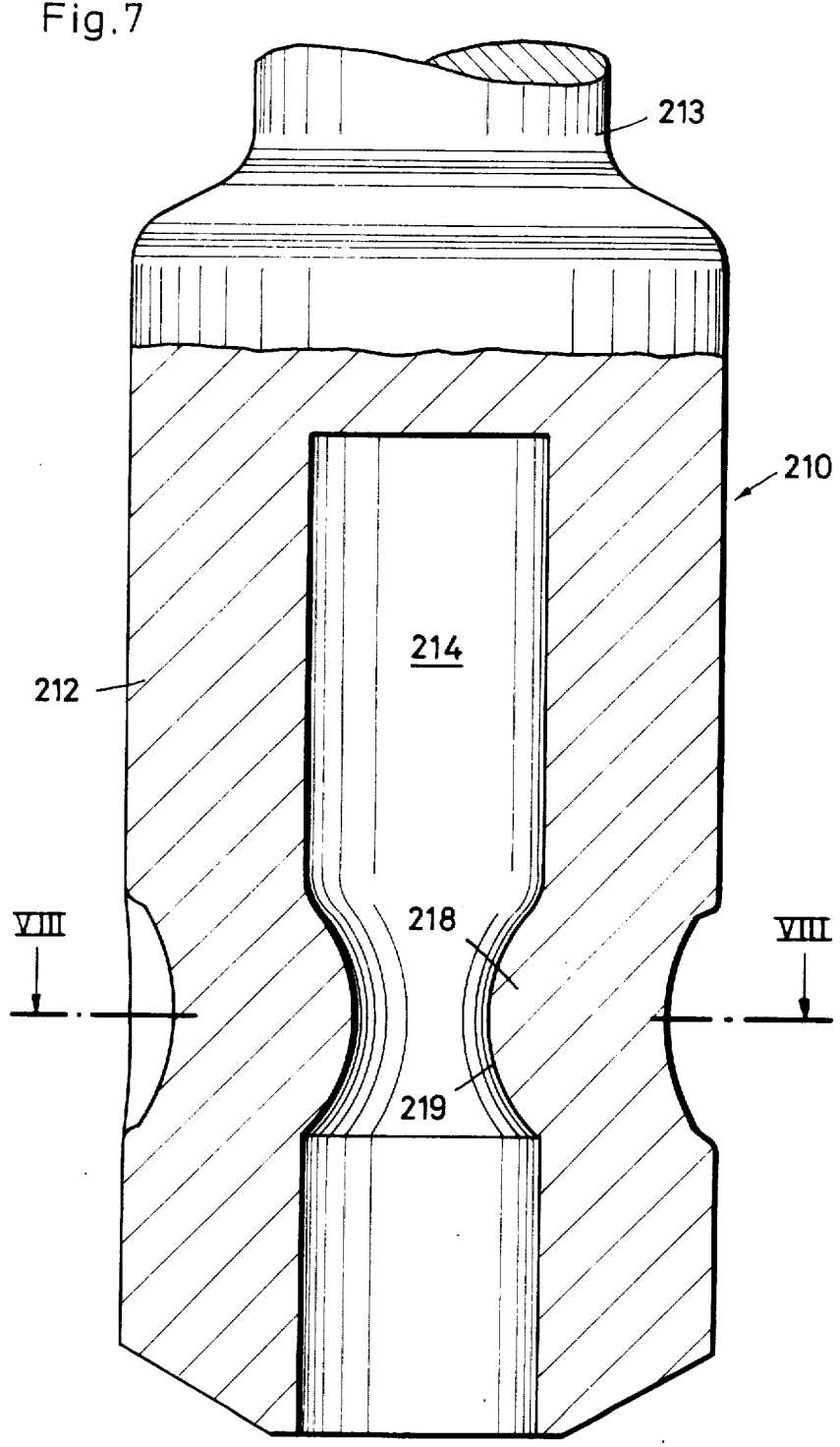
FIG. 7 is a view similar to FIG. 1 which shows still another embodiment of a tool receiving means in accordance with the present invention.
Figure 8:
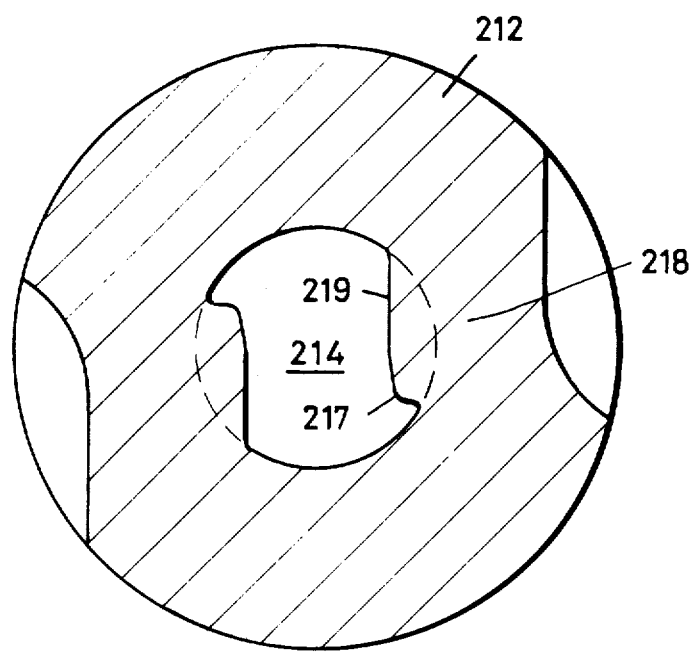
FIG. 8 shows a section along lines VIII — VIII of FIG. 7.
Figure 9:
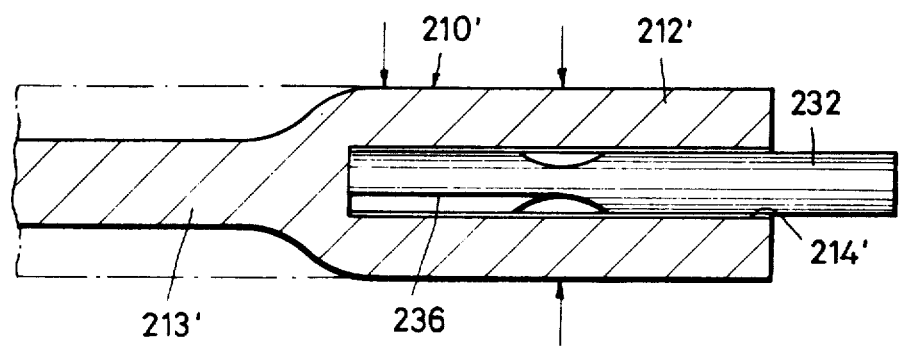
FIG. 9 shows an essential step in the process for manufacturing a tool receiving means in accordance with the present invention and as shown in FIGS. 7 and 8.

FIGS. 7 - 9 show a tool receiving means according to the invention which in spite of the somewhat complicated inner shape of the socket may be produced by a method which may be easily carried out, and which nevertheless allows for exact reproduction of predetermined dimensions, so that a stable and secure guidance of the tool is ensured. The tool receiving means according to this embodiment of the invention, is produced as one integral piece at considerably reduced costs, but the simple and cheap manufacturing method yields a product of improved operational safety.

A tool receiving means 210 which embodies the principles of the present invention, see FIGS. 7 and 8, is mainly a hollow cylindrical socket 212 integrally formed with a shaft 213 and with striker or coupling elements 218. Into hole 214 of socket 212 a correspondingly formed shaft of a tool may be inserted, especially a hammer drill 30 as described above, to which rotational and percussion powers are transmitted and which therefore must be reciprocably movable within means 210 over a limited interval. Surfaces 217, 219, see FIG. 8, which project into hole 214, and the remaining part of the wall of hole 214 are for that reason specially hardened, e.g., by long time hardening at relatively low temperature.

Tool receiving means 210 as shown in the Figures is provided with two elements 218. The coupling or locking elements 218 are equally formed and located on the same axial part of socket 212, but 180° apart. With regard to that part projecting into hole 214, elements 218 have approximately the shape of a part of a cylinder. Surface 219 has approximately the shape of a cylinder jacket portion and allows for a sliding guidance. The adjacent surface 217 consists to a lesser part of a cylinder bottom portion, and besides, of the rounded off connecting area between bottom and jacket. The surfaces 217, 219 originate mathematically by an intersection between a cylinder which forms the wall of hole 214, and a cylinder which has a smaller radius than the hole 214 had and the axis of which is located in a radial plane of hole 214 without intersecting the axis of hole 214. Because of the rotational symmetry, the axis of both elements 218 are in parallel to each other and oppositely directed. Elements 218 project into hole 214 to less than one third of the radius of the hole.

FIG. 9 illustrates an essential part of the manufacturing process for the invention tool receiving means. At first a blank 210' is produced from tool steel and provided with a blind bore 214' so that one end of blank 210' is shaped like a tube or socket. Preferably at the same time, or immediately following the step of making the hole 214', shaft 213' is worked or treated in that way that it is given the shape, e.g., that of shaft 213, which is suited for coupling or connection with a drive means.

Socket portion 212' of the blank is further treated with bold working. For this purpose a backing mandrel 232 is inserted into hole 214'. Mandrel 232 has a substantially similar shape as a shaft of a tool which later on is to be inserted into, and handled by, the completed tool receiving means. Therefore, mandrel 232 is provided with recesses 234 which corresponds to the profile of the coupling elements and which are connected with guiding surfaces 236, similar to surfaces 50, FIGS. 3 and 4. After inserting backing mandrel 232 the wall of portion 212' is deformed by cold working so that elements 218 which project to the interior, are produced. Mandrel 232 and the tool used for the cold working are preferably provided with markings or means which allow for exact alignment of mandrel and working tool. Thereafter, mandrel 232 will be taken out of the socket, and the workpiece will be hardened by longtime hardening at relatively low temperature. The method according to the present invention is applicable also when the tool receiving means is produced from high quality tool steel, e.g., chromium-nickel-molybdenum steel.

The invention has been described here with reference to a hammer drill, the described tool receiving means being a so-called matcher or adaptor by which a drill can be connected to a drill hammer. It is understood that the tool receiving means can also be the socket of the drill hammer itself. Besides, it should be clear that the invention is applicable also to similar power tools, e.g., powdered screw drivers etc.

We claim:

1. A rotational drilling device comprising in combination two releasably connected parts, one of said two parts being a drill with a substantially cylindrical shaft and the other of said two parts being a tool receiving means with a substantially cylindrical bore in which said shaft is received for limited axial movement, said tool receiving means being adapted for connection to rotatable and percussive drive means and having means for imparting rotative and percussive movement to said drill, one of said two parts comprising in relation to said shaft at least one radially extending element which is fixably secured and the other of said two parts comprising in relation to said shaft at least one substantially axially extending elongated recess, said recess having first and second closed axial ends opposite to each other, said recess having a radial depth which corresponds to the radial extension of said element, said recess having a transition surface starting at the radially deepest area of the recess and extending substantially concentrically in relation to the axis of said part provided with said recess, said transition surface starting at a position spaced from said first and second ends of the recess, said transition surface intersecting the longitudinal edge of the recess which is kept free from the transfer of the rotational force by said element, and a guiding surface open at one end and closed in axial direction at its opposite end and connected by said transition surface with said recess, said guiding surface having the same radial depth as said recess and being off-set in circumferential direction in relation to said recess.

2. A device according to claim 1 wherein said element projects from said tool receiving means into said bore thereof, and said shaft of said drill is provided with said recess, said transition surface and said guiding surface.

3. A device according to claim 2 wherein said element has the shape of a part of a cylinder which projects with a part of its rounded off bottom edge and the adjoining parts of the cylinder bottom and the cylinder jacket into said bore of said tool receiving means.

4. A device according to claim 1 wherein said tool receiving means comprises a substantially cylindrical part with a free end from which said bore extends into said tool receiving means as a blind bore having an axial opening at said free end, said at least one element projecting from said cylindrical part into said bore.

5. A device according to claim 4 wherein said at least one element is formed of sintered metal powder.

6. A device according to claim 4 wherein said element is an integral part of said cylindrical part.

7. A device according to claim 1 wherein said guiding surface extends substantially parallel to said axis.

8. A device according to claim 1 wherein said guiding surface is a substantially plane surface.

9. A device according to claim 1 wherein said guiding surface is immediately adjacent to said recess.

10. A device according to claim 1 wherein said transition surface is defined by two spaced radial surfaces perpendicular to said axis.

11. A device according to claim 4 wherein said bore has a bottom axially opposite to said opening, said bottom being convex and of substantially spherical curvature.

12. A device according to claim 4 wherein said bore is lined at said opening with a sleeve which is at least partly of a friction diminishing material.

13. A device according to claim 12 wherein the inner wall of said sleeve is crowned.

14. A device according to claim 2, wherein each recess has between its closed ends a cross-sectional profile defining an obtuse angle.

15. A device according to claim 3, wherein said transition surface substantially forms part of a circular cylindrical surface.

* * * * *